Patented July 6, 1954

2,683,142

UNITED STATES PATENT OFFICE 2,683,142

HIGH pH DIHYDROSTREPTOMYCIN AND PROCESS THEREFOR

Frank J. Wolf, Westfield, N. J., assignor to Merck & Co., Inc., Rahway, N. J., a corporation of New Jersey No Drawing. Application January 26, 1951,
Serial No. 208,057

11 Claims. (Cl. 260—210)

This invention relates to an improved form of dihydrostreptomycin and to the process for preparing the same. More particularly, the invention relates to new dihydrostreptomycin products comprising mixed sulfuric acid salts of dihydrostreptomycin having the characteristic and advantageous property of providing when dissolved in water an aqueous solution having a pH within the range of 7 to 8.

In my pending application Serial No. 70,807, filed January 13, 1949, now Patent No. 2,590,140, I have disclosed and claimed procedures for preparing crystalline dihydrostreptomycin sulfate, a sulfuric acid salt of dihydrostreptomycin having the formula $(C_{21}H_{41}O_{12}N_7)_2.3H_2SO_4$. In a continuation-in-part of said application, i. e., Serial No. 85,946, filed April 6, 1949, now Patent No. 2,590,141, I have further disclosed and claimed procedures for the direct production of crystalline dihydrostreptomycin sulfate by reaction between another salt of dihydrostreptomycin, such as dihydrostreptomycin hydrochloride, and a sulfuric acid salt selected from the group consisting of ammonium sulfate and sulfuric acid salts of alkyl and alkylol amines.

The crystalline dihydrostreptomycin sulfate prepared in accordance with the foregoing procedures has the characteristic property of forming, when dissolved in water, an aqueous solution having a pH of approximately 4.5. While this pH is somewhat below neutrality, it is not sufficiently low to present any problem when dihydrostreptomycin is employed alone for therapeutic or clinical use. There has been a trend, however, in recent months on the part of the medical profession toward recognition of the desirability of administering two or more antibiotics concurrently; and in the administration of mixed antibiotics, the characteristic pH of an aqueous solution made up with crystalline dihydrostreptomycin sulfate presents a problem when it is desired to mix this form of dihydrostreptomycin with an acid sensitive antibiotic such as penicillin. It is known, for example, that penicillin is rapidly decomposed and destroyed at a pH as low as 4.5. It is possible, of course, to prepare a mixed therapeutic agent consisting of crystalline dihydrostreptomycin sulfate and penicillin in the form of a stable solution by adding a large amount of buffering agent to control the pH. The addition of a large amount of extraneous material as buffering agent is, however, objectionable particularly when the preparation is intended for parenteral use. Thus crystalline dihydrostreptomycin sulfate prepared by proceudes described in my pending applications above-mentioned does not lend itself to practical use in mixed antibiotic preparations containing acid sensitive substances such as penicillin.

Attempts have been made to modify the procedure disclosed in the prior application Serial No. 85,946 by adjusting the pH of the reaction mixture during the crystallization of dihydrostreptomycin sulfate to a neutral or slightly alkaline pH. The effect of such adjustment, however, is merely to interfere with and prolong the crystallization step, and it is found that the product obtained still has the characteristic property of forming when dissolved in water a solution having a pH of approximately 4.5–5.0.

In accordance with the present invention which may be considered as a continuation-in-part of the invention disclosed in my pending application Serial No. 85,946 above-mentioned, I have now found that it is possible to overcome the above-mentioned disadvantages of crystalline dihydrostreptomycin sulfate and to produce a dihydrostreptomycin sulfate product which in aqueous solution will have a pH within the range of 7 to 8 by providing a mixture of two sulfuric acid salts of dihydrostreptomycin, i. e., the previously obtained crystalline salt having the formula $(C_{21}H_{41}O_{12}N_7)_2.3H_2SO_4$, and hereinafter referred to as dihydrostreptomycin sesqui-sulfate; and a second salt which can be represented by the formula $C_{21}H_{41}O_{12}N_7.H_2SO_4$, and is hereinafter referred to as dihydrostreptomycin mono-sulfate. This new product can advantageously be prepared by reacting together in a suitable solvent an acid salt of dihydrostreptomycin which is more soluble than dihydrostreptomycin sulfate in the solvent and a sulfuric acid salt selected from the group consisting of ammonium sulfate and sulfuric acid salts of alkyl and alkylol amines which are more soluble than dihydrostreptomycin sulfate in the solvent, and regulating the amount of the sulfuric acid salt in this reaction so that less sulfate is introduced than is required to convert all of the dihydrostreptomycin to the sesqui-sulfate of the formula $(C_{21}H_{41}O_{12}N_7)_2.3H_2SO_4$, i. e., less than 1.5 moles of sulfate per mole of dihydrostreptomycin.

In this metathesis, an aqueous solution of a dihydrostreptomycin salt, as for example the acetate, formate, nitrate, hydrobromide, hydrochloride or tartrate salt of dihydrostreptomycin is prepared and to this solution is added a sulfuric acid salt such as ammonium sulfate, dimethylamine sulfate, triethanolamine sulfate or the like in an amount sufficient to provide a sulfate concentration within the range of about 1.2 to 1.4 moles per mole of dihydrostreptomycin base. This molar ratio represents approximately 80 to 94% of the amount of sulfate required to convert all of the dihydrostreptomycin (base) to dihydrostreptomycin sesqui-sulfate.

To the solution thus obtained is added an organic solvent such as methanol, ethanol, isopropanol, ethylene glycol, or acetone to induce precipitation and/or crystallization of dihydrostreptomycin sulfate. In general, any water miscible solvent in which the solubility of dihydrostreptomycin sulfate is at least as great as in acetone can be employed. The use of methanol, however, is preferred since it leads more readily to the formation of a crystalline product. The solvent is preferably added portionwise, the initial amount being the amount merely sufficient to produce turbulence, or slight precipitation or crystallization from solution, and additional amounts being added as the precipitation or crystallization progresses to carry the crystallization to substantial completion. Thus, for example, when a starting solution containing dihydrostreptomycin hydrochloride equivalent to about 25% of dihydrostreptomycin base is employed and methanol is used as the solvent to induce crystallization, the amount of methanol initially added is about 1.8 times the volume of the reaction mixture; and by adding methanol from time to time until a methanol concentration of about 75% is reached, 95% or more of the dihydrostreptomycin is separated as the new high pH dihydrostreptomycin sulfate.

The product after filtering, washing with methanol and drying is generally crystalline in appearance and is actually a mixture of crystalline dihydrostreptomycin sesqui-sulfate of the formula $(C_{21}H_{41}O_{12}N_7)_2 \cdot 3H_2SO_4$ and dihydrostreptomycin mono-sulfate of the formula $C_{21}H_{41}O_{12}N_7 \cdot H_2SO_4$. This product when dissolved in water to form 25% to 50% solutions gives solutions having a pH of about 7.0–8.0. The particular pH obtained in such solutions is dependent upon the composition of the dihydrostreptomycin sulfate as controlled by the amount of sulfuric acid salt initially employed in the metathesis. These mixtures may vary within the range of about 70 to 85% of dihydrostreptomycin sesqui-sulfate of the formula

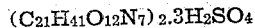

$(C_{21}H_{41}O_{12}N_7)_2 \cdot 3H_2SO_4$ and 15–30% of dihydrostreptomycin mono-sulfate of the formula $C_{21}H_{41}O_{12}N_7 \cdot H_2SO_4$, the lower amount of sulfuric acid salt employed in the metathesis bringing about larger proportions of dihydrostreptomycin mono-sulfate and providing higher pH values for aqueous solutions of the resulting product.

An alternative procedure for obtaining high pH dihydrostreptomycin sulfate mixtures which is particularly useful when quantities of dihydrostreptomycin sulfate of low pH value are available is to treat such low pH dihydrostreptomycin sulfate with an anion exchange resin on the hydroxide cycle to remove a predetermined or calculated amount of sulfate ions. Suitable resins include melamine and phenol formaldehyde anion exchange resins such as Ionac A-300, Amberlite IR4B, Dowex 1A and Duolite 3A.

This ion-exchange procedure can be carried out by contacting a solution of low pH dihydrostreptomycin sulfate with an anion exchange resin having a known capacity for sulfate ion in an amount sufficient to remove the calculated amount of sulfate ion from a solution of the low pH dihydrostreptomycin sulfate. The contacting of dihydrostreptomycin sulfate solution with the resin can be carried out by simple mixing or batchwise procedure but is preferably carried out by passing the solution of dihydrostreptomycin sulfate through a column of the resin.

In passing the dihydrostreptomycin sulfate solution through a column of resin, the effluent solution is tested from time to time to determine when dihydrostreptomycin first appears. (The effluent solution is readily tested for the presence of dihydrostreptomycin by adding methanol to a portion of the effluent, a turbulence in the resulting mixture indicating the presence of dihydrostreptomycin.) The feeding of solution is then preferably stopped for 10 to 15 minutes to permit the solution and resin to come to equilibrium and the remainder of the solution is then fed through the column, the resulting effluent being collected. The solution is then followed by a quantity of water to remove residual dihydrostreptomycin sulfate from the column and the combined washings and collected effluent can then be processed to crystallize high pH dihydrostreptomycin sulfate therefrom. Thus, for example, by adjusting the concentration of this solution to about 20% dihydrostreptomycin (base) and adding about three volumes of methanol, a dihydrostreptomycin sulfate mixture crystallizes out which has the desired high pH, i. e., within the range of 7 to 8.

It will be apparent that the preparation of high pH dihydrostreptomycin sulfate by ion exchange as above-described, although distinctly advantageous when low pH dihydrostreptomycin sulfate is available, amounts to an additional and unnecessary step when new high pH sulfate is being prepared from dihydrostreptomycin salts other than sulfate, such for example as dihydrostreptomycin hydrochloride. When starting with a different salt of dihydrostreptomycin, proper control of the metathesis reaction as herein described leads directly to dihydrostreptomycin sulfate of the desired high pH value. The ion exchange procedure above described provides, however, an effective supplementary treatment for adjusting the composition of the high pH dihydrostreptomycin mixture in the event that the product obtained in metathesis contains too great a proportion of the sesqui-sulfate, i. e., more than 85%.

The following examples will show how procedures in accordance with the present invention can be carried out, but it is to be understood that these examples are given by way of illustration and not of limitation.

*Example 1*

A quantity of dihydrostreptomycin hydrochloride rich water after treatment with silver carbonate to remove free chloride was withdrawn from normal factory operations in the production of low pH dihydrostreptomycin sulfate. This rich water contained 34.6% solids and 25.2% of dihydrostreptomycin base (determined by optical rotation). 160 cc. portions of this rich water, i. e., portions containing 40 g. or 0.0686 mole of dihydrostreptomycin base were adjusted to pH 9.2 by addition of 21 cc. of 6 N ammonium hydroxide. The volume of each portion was then adjusted to 200 cc. To one of these solutions was then added 12.60 g. (0.096 mole) of ammonium sulfate. This amount of ammonium sulfate is 93.3% of the amount calculated for complete conversion of the dihydrostreptomycin hydrochloride to dihydrostreptomycin sesquisulfate of the formula $(C_{21}H_{41}O_{12}N_7)_2.3H_2SO_4$. Methanol was added with agitation to the resulting solution to bring about crystallization of dihydrostreptomycin sulfate. The amount of methanol required to produce initial turbulence was about 360 cc. (1.8 volumes). The stirring was continued with further additions of methanol from time to time until the concentration of methanol was approximately 75%, at which point further additions of methanol produced no turbulence in the reaction mixture. The crystallized product was then filtered, washed with 1:1 methanol-water and dried, yielding 49 g. of product containing 38.2 g. of dihydrostreptomycin base (determined by optical rotation). This represents a 95.5% recovery of the dihydrostreptomycin. This product when dissolved in water forms a 25% solution having a pH of 7.3 and a 50% solution having a pH of 7.5.

Additional portions of the starting solution were treated with 11.78 g. and 10.87 g. respectively of ammonium sulfate following the procedures above-described. The results of the three preparations are tabulated below:

| Ammonium Sulfate Charged | | Dihydrostreptomycin Charged Base, Grams | Crystalline Product, Grams | Base in Product (By Rotation) | | Yield, Percent | pH of Final Product | |
|---|---|---|---|---|---|---|---|---|
| M. R.[1] | Grams | | | Percent | Grams | | 50% Solution | 25% Solution |
| 1.2 | 10.87 | 40 | 42.7 | 78 | 33.4 | 83.5 | 7.9 | 7.7 |
| 1.3 | 11.78 | 40 | 46.6 | 78.2 | 36.5 | 91.4 | 7.6 | 7.4 |
| 1.4 | 12.68 | 40 | 49.0 | 78.0 | 38.2 | 95.5 | 7.5 | 7.3 |

[1] Molar Ratio (moles per mole of dihydrostreptomycin base).

Example 2

A quantity of the high pH dihydrostreptomycin sulfate obtained in Example 1 (the product forming pH 7.3 and 7.5 solutions) was recrystallized from aqueous methanol by different procedures to ascertain the effect of strength of solution and methanol concentration on the crystallization yield. Solutions of the high pH dihydrostreptomycin sulfate containing 18.5, 20 and 25% total solids were prepared, and the dihydrostreptomycin sulfate was crystallized therefrom by addition of methanol in different total amounts. The crystalline product was filtered in each instance, washed with about 3 cc./g. of methanol and dried in vacuo at 65° C. The yields of recrystallized product and the amounts of dihydrostreptomycin sulfate appearing in the mother liquors as determined by optical rotation are tabulated below:

| Dihydrostreptomycin Solution, Total Solids, Percent | Final Methanol Concentration, Percent | Percent Yield Based on Optical Rotation | Mother Liquors, Percent Based on Optical Rotation |
|---|---|---|---|
| 18.5 | 66 | 95.3 | 4.1 |
|  | 75 | 98.0 | 2.6 |
|  | 55 | 93.2 | 4.6 |
| 20.0 | 66 | 95.0 | 3.2 |
|  | 75 | 97.4 | 1.5 |
| 25.0 | 66 | 95.8 | 1.9 |
|  | 75 | 98.6 | 1.2 |

The foregoing data indicates that optimum crystallization of high pH dihydrostreptomycin sulfate is obtained when the final methanol concentration is about 75%. By way of comparison, optimum crystallization of low pH dihydrostreptomycin sulfate of the formula $$(C_{21}H_{41}O_{12}N_7)_2.3H_2SO_4$$

is obtained with a final methanol concentration of approximately 55%.

Example 3

About 150 cc. (100 g.) of an anion exchange resin, Ionac A–300, a weak base melamine type resin produced by American Cyanamid Co. was prepared in a column and treated with 450 cc. of 10% sulfuric acid, 450 cc. of water, and 450 cc. of 10% sodium hydroxide to convert the resin to the hydroxide cycle. 760 cc. of a 40% solution of dihydrostreptomycin sulfate (low pH material) containing 210 g. of dihydrostreptomycin base as determined by optical rotation was passed through the column at a rate of 12.5 cc. per minute (contact time of 12 minutes). The addition of the dihydrostreptomycin sulfate solution was made rapidly until a positive test was obtained in the eluate (the presence of dihydrostreptomycin sulfate being indicated by the formation of a precipitate on addition of methanol to the eluate). The flow of solution was then stopped and the column was allowed to stand for about 15 minutes before resuming operation. The remainder of the starting solution was then fed to the column and the effluent containing high pH dihydrostreptomycin sulfate was collected. When the entire 700 cc. of solution had been added to the column, the column was then washed with 450 cc. of water and the resulting effluent combined with the main effluent. This combined solution contained 200.6 g. of dihydrostreptomycin base as determined by optical rotation representing a 95% recovery in the resin treatment.

In the foregoing procedure, the initial effluent (not collected) had a pH value between 10.4 and 10.8, while the main effluent had a pH of about 7.5 to 7.6. When the collected effluent and washings were diluted to provide a 20% solution of dihydrostreptomycin sulfate and this product was crystallized by addition of three volumes of methanol, the crystalline product obtained was a desired high pH product which when dissolved in water at a concentration of about 25% formed a solution having a pH of about 7.4.

Various changes and modifications in the foregoing procedures will occur to those skilled in the art, and to the extent that such changes and modifications are embraced by the appended claims, it is to be understood that they constitute part of my invention.

I claim:

1. A high pH dihydrostreptomycin sulfate product consisting of 70–85% dihydrostreptomycin sesqui-sulfate of the formula $$(C_{21}H_{41}O_{12}N_7)_2.3H_2SO_4$$

and 15–30% of dihydrostreptomycin mono-sulfate of the formula $C_{21}H_{41}O_{12}N_7 \cdot H_2SO_4$, said product being a crystalline material; and having the property of forming, when dissolved in water, a solution having a pH within the range of pH 7–8.

2. The process for preparing high pH dihydrostreptomycin sulfate that comprises preparing an aqueous solution of a dihydrostreptomycin acid salt which is more soluble than dihydrostreptomycin sulfate, adding thereto a sulfuric acid salt selected from the group consisting of ammonium sulfate and sulfuric acid salts of alkyl and alkylol amines that are more soluble than dihydrostreptomycin sulfate, the amount of said sulfuric acid salt being less than 1.5 moles per mole of dihydrostreptomycin, and crystallizing high pH dihydrostreptomycin sulfate from the reaction mixture by addition of a water miscible organic solvent.

3. The process as defined in claim 2 wherein the amount of sulfuric acid salt is about 1.2 to 1.4 moles per mole of dihydrostreptomycin.

4. The process as defined in claim 2 wherein the organic solvent is added incrementally.

5. The process for preparing high pH dihydrostreptomycin sulfate that comprises preparing an aqueous solution of a dihydrostreptomycin acid salt which is more soluble than dihydrostreptomycin sulfate, adding thereto a sulfuric acid salt selected from the group consisting of ammonium sulfate and sulfuric acid salts of alkyl and alkylol amines that are more soluble than dihydrostreptomycin sulfate, the amount of said sulfuric acid salt being less than 1.5 moles per mole of dihydrostreptomycin and crystallizing high pH dihydrostreptomycin sulfate from the reaction mixture by addition of methanol.

6. The process for preparing high pH dihydrostreptomycin sulfate that comprises preparing an aqueous solution of a dihydrostreptomycin acid salt which is more soluble than dihydrostreptomycin sulfate, adding thereto a sulfuric acid salt selected from the group consisting of ammonium sulfate and sulfuric acid salts of alkyl and alkylol amines that are more soluble than dihydrostreptomycin sulfate, the amount of said sulfuric acid salt being less than 1.5 moles per mole of dihydrostreptomycin, adding to the reaction mixture about 1.8 volumes of methanol, thereby inducing the separation of an essentially crystalline precipitate, and increasing the methanol concentration gradually to about 75% to insure maximum recovery of essentially crystalline high pH dihydrostreptomycin sulfate.

7. The process for preparing high pH dihydrostreptomycin sulfate that comprises preparing an aqueous solution of dihydrostreptomycin hydrochloride, adding thereto ammonium sulfate in the amount of about 1.2–1.4 moles per mole of dihydrostreptomycin, and crystallizing high pH dihydrostreptomycin sulfate by addition of a water miscible organic solvent.

8. The process as defined in claim 7 wherein the crystallizing solvent is methanol.

9. The process for preparing high pH dihydrostreptomycin sulfate that comprises preparing an aqueous solution of dihydrostreptomycin hydrochloride, adding thereto ammonium sulfate in the amount of about 1.2–1.4 moles per mole of dihydrostreptomycin, adding to the reaction mixture about 1.8 volumes of methanol, thereby inducing separation of an essentially crystalline precipitate, and increasing the methanol concentration gradually to about 75% to insure maximum recovery of essentially crystalline high pH dihydrostreptomycin sulfate.

10. In a process for preparing a high pH dihydrostreptomycin sulfate, having a composition within the range of 70–85% dihydrostreptomycin sesqui-sulfate of the formula $$(C_{21}H_{41}O_{12}N_7)_2 \cdot 3H_2SO_4$$

and 15–30% dihydrostreptomycin mono-sulfate of the formula $C_{21}H_{41}O_{12}N_7 \cdot H_2SO_4$, from a low pH dihydrostreptomycin sulfate comprising 85–100% dihydrostreptomycin sesqui-sulfate, the steps that comprise treating a solution of the low pH dihydrostreptomycin sulfate with an anion exchange resin, having a known capacity for sulfate ion, in an amount sufficient to remove a calculated amount of sulfate ion from said solution, and crystallizing high pH dihydrostreptomycin sulfate from the resulting solution by addition of a water miscible organic solvent.

11. The process that comprises treating an aqueous solution containing dihydrostreptomycin sesqui-sulfate of the formula $$(C_{21}H_{41}O_{12}N_7)_2 \cdot 3H_2SO_4$$

with a calculated amount of an anion exchange resin having a known capacity for sulfate ion, thereby converting a proportionate amount of said sesqui-sulfate to dihydrostreptomycin mono-sulfate of the formula $C_{21}H_{41}O_{12}N_7 \cdot H_2SO_4$.

References Cited in the file of this patent

UNITED STATES PATENTS

| Number | Name | Date |
|---|---|---|
| 2,446,192 | Peck | July 27, 1948 |
| 2,528,022 | Van Dolah et al. | Oct. 31, 1950 |
| 2,537,941 | Regna et al. | Jan. 9, 1951 |
| 2,552,547 | Fried et al. | May 15, 1951 |

FOREIGN PATENTS

| Number | Country | Date |
|---|---|---|
| 616,438 | Great Britain | Jan. 21, 1949 |

OTHER REFERENCES

Donovich, J. Bact., v. 53 (1947), pages 205–211.